United States Patent
Ishida et al.

(10) Patent No.: US 7,342,930 B2
(45) Date of Patent: Mar. 11, 2008

(54) COMMUNICATION EQUIPMENT, COMMUNICATION SYSTEM, AND COMMUNICATION METHOD

(75) Inventors: So Ishida, Yokosuka (JP); Kenji Ishii, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 928 days.

(21) Appl. No.: 10/642,215

(22) Filed: Aug. 18, 2003

(65) Prior Publication Data

US 2004/0037297 A1 Feb. 26, 2004

(30) Foreign Application Priority Data

Aug. 20, 2002 (JP) ............... 2002-239809

(51) Int. Cl.
*H04L 12/28* (2006.01)
*H04L 12/56* (2006.01)

(52) U.S. Cl. ............................... 370/395.54

(58) Field of Classification Search ........ 370/401, 370/354, 467, 395–397, 349, 252, 257, 468, 370/487, 352, 435, 465; 455/435, 422, 423, 455/456; 709/220, 238, 249; 713/322, 321, 713/330; 704/258, 201, 205; 710/67, 314, 710/310; 711/119, 121, 129, 118; 726/19
See application file for complete search history.

(56) References Cited

U.S. PATENT DOCUMENTS 4,158,886 A * 6/1979 Gray et al. ............... 710/67
5,974,300 A * 10/1999 LaPorta et al. ............ 340/7.23
6,452,946 B1 * 9/2002 Manzardo ................. 370/487
6,691,200 B1 * 2/2004 Zhou et al. ................ 710/314
6,892,069 B1 * 5/2005 Flynn ........................ 455/432.1
2001/0053133 A1 * 12/2001 Horikawa ................... 370/328
2003/0142681 A1 * 7/2003 Chen et al. ................. 370/401
2004/0152439 A1 * 8/2004 Kimura et al. ............. 455/403
2005/0213555 A1 * 9/2005 Eyuboglu et al. .......... 370/349

FOREIGN PATENT DOCUMENTS

| JP | 2000-305876 | 11/2000 |
|----|-------------|---------|
| JP | 2001-60956  | 3/2001  |
| JP | 2002-94595  | 3/2002  |
| JP | 2003-188905 | 7/2003  |

OTHER PUBLICATIONS

Siu-Cheung Hui, et al., Computer Communications, vol. 21, No. 3, pp. 254-266, XP-004115293, "A Dynamic IP Addressing System for Internet Telephony Applications", Mar. 25, 1998.

* cited by examiner

*Primary Examiner*—Wing Chan
*Assistant Examiner*—Prenell Jones
(74) *Attorney, Agent, or Firm*—Oblon, Spivak, McClelland, Maier & Neustadt, P.C.

(57) ABSTRACT

A communication equipment comprises a reception/transmission unit configured to notify a target equipment of a plurality of addresses provided for the communication equipment, acquire a plurality of target equipment addresses provided for the target equipment, from the target equipment, and perform packet reception/transmission using a plurality of provided addresses and a plurality of acquired target equipment addresses; and a controller configured to select the target equipment address to be used by the reception/transmission unit, and control the reception/transmission unit to perform the packet reception/transmission using a selected target equipment address.

9 Claims, 7 Drawing Sheets

COMMUNICATION EQUIPMENT, COMMUNICATION SYSTEM, AND COMMUNICATION METHOD

CROSS REFERENCE TO RELATED APPLICATIONS

This application is based upon and claims the benefit of priority from the prior Japanese Patent Application No. P2002-239809, filed on Aug. 20, 2002; the entire contents of which are incorporated herein by reference.

BACKGROUND OF THE INVENTION

1. Field of the Invention

The present invention relates to a communication equipment, a communication system, and a communication method.

2. Description of the Related Art

Conventionally, a communication equipment that performs packet communication using an Internet protocol (IP) address uses one IP address for each communication. A communication procedure to be performed by a communication equipment to which an IP address is provided, respectively, is described as taking a host A and host B as an example. The host A sets its own IP address as the source address, and transmits to the host B a packet where an IP address of the host B is set as the destination address to start communication. After receiving the transmitted packet, the host B sets the source address included in the received packet as the destination address of the packet, and sets the destination address included in the received packet as the source address of the packet, and then transmits the packet to the host A. Through repetition of this procedure, the host A and host B communicate. Note that the route for packet reception/transmission is determined by routers that exist between the communication equipments, based on the source address or destination address of each packet.

In addition, an IP address is, normally, provided for each media in an IP network. For example, a local area network (LAN) forms one media, and an IP address is provided for each LAN. This is similar to the case of a wireless LAN, which has become more prevalent in recent years. The wireless LAN is an area network where a base station is connected to a fixed LAN, and where a mobile communication equipment having a wireless LAN card performs wireless communication with a LAN by connecting to the base station.

However, conventionally, a communication equipment can use only one IP address for each communication. As a result, a packet reception/transmission route determined by a router based on a source address or a destination address of a packet is almost always fixed to one route even though there may be a plurality of routes between communication equipments. Accordingly, a communication equipment cannot perform packet reception/transmission using a more preferable route or packet reception/transmission using a plurality of routes. As a result, effective data transfer cannot be performed.

In addition, if a srperate IP address is provided within each LAN, a communication equipment cannot use an IP address that is provided within one LAN, within another LAN. In a wireless LAN, the same IP address can be used if the communication equipment exists within the same wireless LAN area even if the communication equipment moves and changes the base station connection. However, in the case where the communication equipment moves outside the wireless LAN area, even if the communication equipment can find and connect to a new base station, the new base station connects to a wireless LAN, which is different from the previously connected wireless LAN. As a result, the communication equipment becomes unable to use the IP address provided for the previously connected wireless LAN.

Accordingly, the communication equipment must acquire a new IP address that can be used with the newly connected wireless LAN. Also, there is a problem in that the communication equipment cannot maintain prior communication. That is, the communication equipment cannot guarantee continuous mobile communication. Mobile IP has been proposed as a technology for solving such problems. However, a specific function for using Mobile IP must be provided for the IP network in advance.

BRIEF SUMMARY OF THE INVENTION

An object of the present invention is to provide a communication equipment, a communication system, and a communication method, which can perform effective data transfer and mobile communication.

A communication system of the present invention comprises a communication equipment provided with a plurality of addresses, and a target equipment provided with a plurality of target equipment addresses, and configured to perform packet reception/transmission from/to the communication equipment. The communication equipment of the present invention comprises a reception/transmission unit configured to notify the target equipment of a plurality of provided addresses, acquire a plurality of target equipment addresses, from the target equipment, and perform packet reception/transmission using the plurality of provided addresses and the plurality of acquired target equipment addresses; and a controller configured to select the target equipment address to be used by the reception/transmission unit, and control the reception/transmission unit to perform the packet reception/transmission using a selected target equipment address. Note that the target equipment is a target communication equipment for performing packet reception/transmission. The target equipment address is an address provided for the target equipment.

According to the communication system or the communication equipment of the present invention, a plurality of addresses is provided for the communication equipment. The reception/transmission unit notifies the target equipment, which is the target for communication, of the plurality of addresses. In addition, the reception/transmission unit acquires the plurality of target equipment addresses. The reception/transmission unit then performs packet reception/transmission using the plurality of addresses provided for the communication equipment and the plurality of acquired target equipment addresses. Furthermore, the controller selects the target equipment address to be used by the reception/transmission unit and controls the reception/transmission unit to perform packet reception/transmission using it.

Accordingly, the communication equipment may perform packet reception/transmission via a plurality of routes by using a plurality of addresses provided for itself and the plurality of target equipment addresses. As a result, the communication equipment may perform high-speed data transfer, that is, the communication equipment may perform more effective data transfer. Furthermore, if the communication equipment moves, the communication equipment may use a plurality of addresses provided for itself even when it moves between different networks. Therefore, the communication equipment does not require the acquisition of a new address, and it may continue communication. In addition, if the target equipment moves, the communication equipment may use the plurality of target equipment addresses even when the target equipment moves between different networks. Therefore, the communication equipment may continue to maintain prior communication. Accordingly, the communication equipment may guarantee continuous mobile communication.

A communication method of the present invention comprises notifying a target equipment of a plurality of addresses provided for a communication equipment, acquiring a plurality of target equipment addresses provided for the target equipment, selecting the target equipment address to be used for packet reception/transmission, and performing the packet reception/transmission using the plurality of addresses provided for the communication equipment and a selected target equipment addresses.

According to the communication method of the present invention, the communication equipment may perform packet reception/transmission via the plurality of routes by using a plurality of addresses provided for itself and the plurality of target equipment addresses. As a result, the communication equipment may perform high-speed data transfer, that is, may perform more effective data transfer. Furthermore, if the communication equipment moves, the communication equipment may use the plurality of addresses provided for itself even when it moves between different networks. Therefore, the communication equipment does not require acquiring a new address, and it may continue communication. In addition, if the target equipment moves, the communication equipment may use the plurality of target equipment addresses even when the target equipment moves between different networks. Therefore, the communication equipment may continue to maintain prior communication. Accordingly, the communication equipment may guarantee continuous mobile communication.

DETAILED DESCRIPTION OF THE INVENTION

[Communication System]

(Configuration of Communication System)

Figure 1:
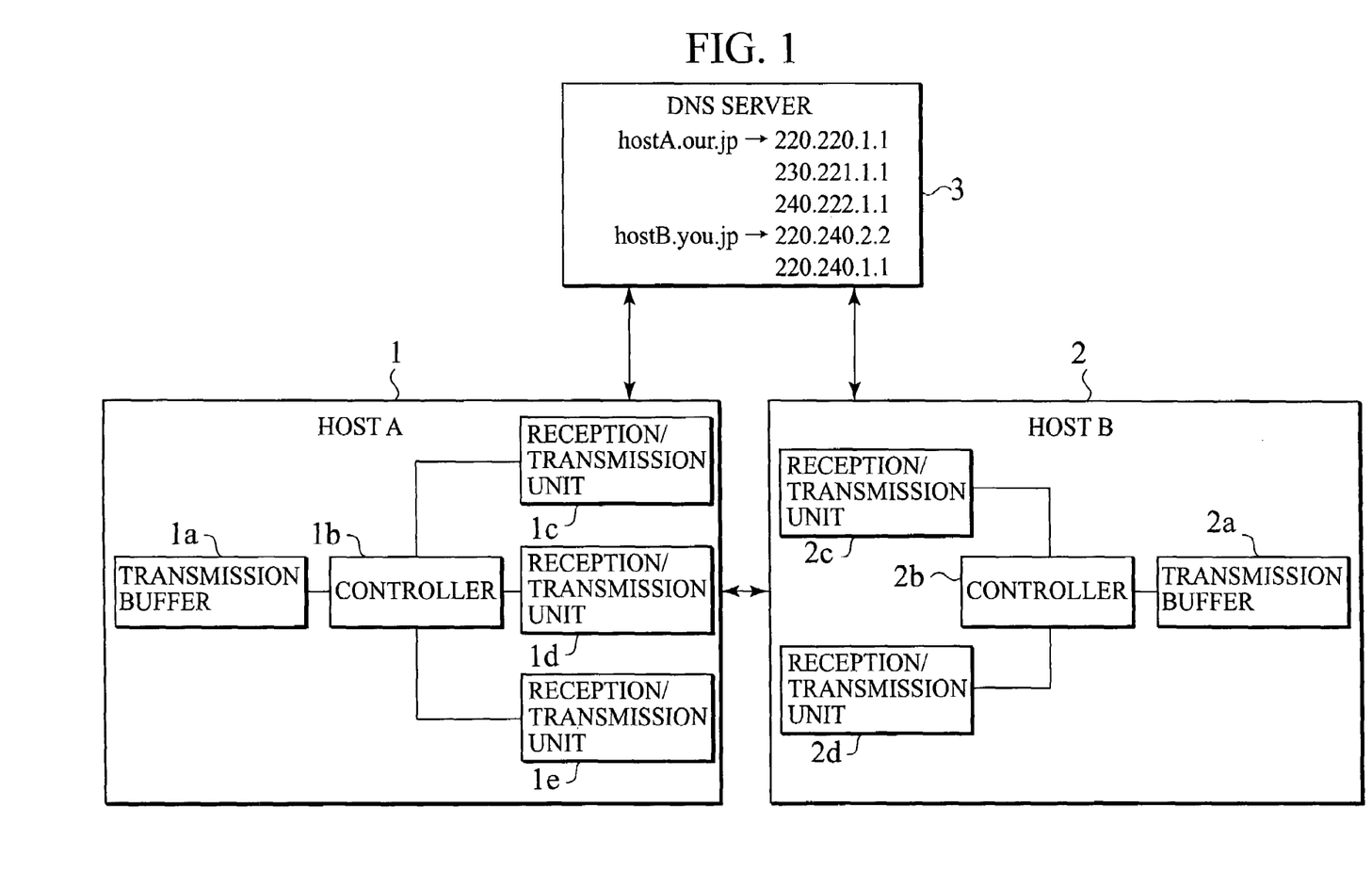
FIG. 1 is a block diagram illustrating a configuration of a communication system according to an embodiment of the present invention.

As shown in FIG. 1, a communication system comprises a host A1, a host B2, and a domain name system (DNS) server 3. The host A1 and the host B2 exist in different networks. The host A1, the host B2, and the DNS server 3 are connected via a network. The host A1 and the host B2 are communication equipments, such as a terminal equipment or a server that perform packet reception/transmission. The host B2 is a target equipment for performing packet reception/transmission in view of the host A1; and the host A1 is a target equipment in view of the host B2. In FIG. 1, only two hosts are illustrated in order to simplify the explanation, however, there are more hosts in the communication system.

A plurality of IP addresses is provided for the host A 1 and the host B2, respectively. Hereafter, a plurality of IP addresses is called "a group of IP addresses" when they are referred to collectively. IP addresses may be provided manually when setting up the host A1 or the host B2, for example. In addition, IP addresses may be provided through a dynamic host configuration protocol (DHCP) when the host A1 or the host B 2 is activated. IP addresses may also be provided through a point to point protocol (PPP) when the host A1 or host B2 connects to the network by a dial up connection, or the like. Note that an IP address is managed and provided by an Internet service provider (ISP), for example. The host A1 and the host B2 may connect to the network managed by a plurality of Internet service providers in order to acquire IP addresses managed by respective Internet service providers. The IP addresses of the host B2 are target equipment addresses for the host A1; and the IP addresses of the host A1 are target equipment addresses for the host B2.

The host A1 and the host B2 associate the plurality of provided IP addresses with domain names, and register them in the DNS server 3. When an IP address is changed, the host A 1 and the host B2 update the IP addresses registered in the DNS server 3 and register the latest IP address by using a dynamic DNS (see request for comments (RFC) 2136). Note that a plurality of IP addresses and domain names may be registered manually in the DNS server 3 when the host A1 or the host B 2 is set up.

The DNS server 3 associates and stores a plurality of IP addresses provided for the host A1 and for the host B2 with the domain names of the host A1 and the host B2, respectively. As shown in FIG. 1, the DNS server 3 associates and stores the domain name of the host A1 "hostA.our.jp" with a plurality of IP addresses provided for the host A1 "220.220.1.1, 230.221.1.1, and 240.222.1.1". In addition, the DNS server 3 associates and stores the domain name of the host B2 "hostB.you.jp" with a plurality of IP addresses provided for the host B2 "220.240.2.2 and 220.240.1.1".

The host A1 and the host B2 comprise transmission buffers 1a and 2a, controllers 1b and 2b, and a plurality of reception/transmission units 1c through 1e and 2c and 2d, respectively. The reception/transmission units 1c through 1e, 2c, and 2d perform packet reception/transmission. An IP address is provided for each of the reception/transmission units 1c through 1e, 2c, and 2d, respectively. More specifically, one of the plurality of IP addresses provided for the host A1 is provided for each of the reception/transmission units 1c through 1e, respectively. Similarly, one of the plurality of IP addresses provided for the host B2 is provided for each of the reception/transmission units 2c and 2d, respectively.

The reception/transmission units 1c through 1e notify the host B2, of a plurality of IP addresses provided for the host A1. Then, the reception/transmission units 2c and 2d acquire a plurality of IP addresses provided for the host A1 as the target equipment addresses, from the host A1, which is the target equipment. Similarly, the reception/transmission units 2c and 2d notify the host A1, of a plurality IP addresses provided for the host B2. Then, the reception/transmission units 1c through 1e acquire a plurality of IP addresses provided for the host B2 as the target equipment addresses, from the host B2, which is the target equipment.

The controllers 1b and 2b control the reception/transmission units 1c through 1e and 2c and 2d, respectively. More specifically, the controllers 1b and 2b select target equipment addresses to be used by the reception/transmission units 1c through 1e and 2c and 2d, and control the reception/transmission units 1c through 1e and 2c and 2d to perform packet reception/transmission using the selected target equipment addresses, respectively. In addition, the controllers 1b and 2b generate packets. The transmission buffers 1a and 2a store data to be transmitted to the target equipment from the host A1 and the host B2, respectively.

(Notification and Acquisition of IP Address)

To begin with, an operation is described wherein upon starting communication, the host A1 and the host B2 notify the target equipment of a plurality of IP addresses provided for themselves, respectively, and acquire from the target equipment a plurality of IP addresses provided for the target equipment. Here, a case where the host A1 attempts to start communication is described as an example.

To begin with, before starting communication, the controller 1b of the host A1 instructs the reception/transmission units 1c through 1e to inquire after a group of IP addresses of the host B2 from the DNS server 3, using the domain name of the host B2 as a key. Note that the controller 1b stores the domain name of the host B2 through manual setting or the like. The reception/transmission units 1c through 1e transmit inquiry packets to the DNS server 3. The DNS server 3 transmits packets including a group of IP addresses of the host B2 to the reception/transmission units 1c through 1e. The controller 1b acquires a group of IP addresses of the host B2 from the packet received by the reception/transmission units 1c through 1e. The controller 1b creates a notification packet including a group of available IP addresses provided for the host A1, in order to start communication. The controller 1b sets one of the IP addresses included in the acquired group of IP addresses of the host B2, as a destination address of the notification packet. The controller 1b inputs a created notification packet to one of the reception/transmission units 1c through 1e. One of the reception/transmission units 1c through 1e transmits the notification packet to the host B2 to notify the host B2, of a group of available IP addresses provided for the host A1.

The reception/transmission unit 2c or 2d of the host B 2 to which the destination address of the notification packet is provided receives the notification packet and acquires a group of available IP addresses provided for the host A1. The reception/transmission unit 2c or 2d inputs the received notification packet to the controller 2b. The controller 2b acquires a group of available IP addresses provided for the host A1 from the notification packet. Subsequently, the controller 2b recognizes that all the packets where addresses of the acquired group of IP addresses, provided for the host A1 are set as the source addresses, are the ones transmitted from the host A1.

The controller 2b creates a response packet corresponding to the notification packet for starting communication. The controller 2b creates the response packet including a group of available IP addresses provided for the host B2. The controller 2b sets the destination address of the notification packet received from the host A1 as a source address. The controller 2b sets one of the IP addresses included in the acquired group of IP addresses of the host A1 as a destination address of the response packet. The controller 2b inputs the created response packet to the reception/transmission unit 2c or 2d to which is provided the source address of the response packet. The reception/transmission unit 2c or 2d transmits the response packet to the host A1 to notify of a group of available IP addresses provided for the host B2.

One of the reception/transmission units 1c through 1e of the host A1 to which the destination address of the response packet is provided receives the response packet, and acquires a group of available IP addresses provided for the host B2. One of the reception/transmission units 1c through 1e then inputs the received response packet to the controller 1b. The controller 1b acquires a group of available IP addresses provided for the host B2 from the response packet. Subsequently, the controller 1b recognizes that all the packets where addresses of the acquired group of IP addresses, provided for the host B2 are set as the source addresses, are the ones transmitted from the host B2. Note that the host A1 recognizes a group of IP addresses included in the response packet from the host B2, as a group of IP addresses of the host B2, since the available IP addresses may be changed, although a group of IP addresses of the host B2 is acquired from the DNS server 3. In this manner, the host A1 and the host B2 notify the target equipment of a plurality of available IP addresses provided for themselves, acquire a plurality of available IP addresses provided for the target equipment from the target equipment, and then communication is started.

The controllers 1b and 2b may set a group of IP addresses as an option parameter of a transmission control protocol (TCP) header, for example, when creating the notification packet or the response packet including a group of IP addresses (see RFC 793). In addition, the controllers 1b and 2b may set a group of IP addresses as an optional extended header or a data field, in the case of an IP version 6 (Ipv6) packet. The controllers 1b and 2b may set a group of IP addresses as an option parameter of a header or a data field, in the case of an IPv4 packet.

Furthermore, the host A1 and the host B2 notify the target equipment of a group of available IP addresses, and acquire a group of available IP addresses from the target equipment not only when starting communication but also in the case where a group of available IP addresses has changed. There is an addition case of a group of IP addresses, such as providing a new IP address for the host A1 or for the host B2, or becoming available from an unavailable IP address. There is a deletion case of a group of IP addresses, such as becoming unavailable from an available IP address provided for the host A1 or for the host B2. In addition, the host A1 and the host B2 may regularly notify the target equipment of a group of IP addresses and acquire a group of IP addresses from the target equipment, in order to confirm a group of available IP addresses.

For example, in the addition case, such as providing a new IP address for the host A1, or becoming available from an unavailable IP address, the controller 1b creates an notification packet including the added IP address. One of the reception/transmission units 1c through 1e then transmit the notification packet to the host B2 in order to notify of a group of available IP addresses provided for the host A1 including the added IP address. The reception/transmission unit 2c or 2d of the host B2 receives the notification packet and acquires a group of available IP addresses provided for the host A1 including the added IP address. The reception/transmission unit 2c or 2d inputs the received notification packet to the controller 2b. The controller 2b acquires the added IP address, and subsequently recognizes that the packet where the added IP address is set as the source address is also a packet transmitted from the host A1. The controller 2b creates an acknowledgement packet where the added IP address is set as a destination address. The reception/transmission unit 2c or 2d then transmits the acknowledgement packet to the host A1. Through reception of the confirmation packet, the controller 1b of the host A1 may confirm that the host B2 has acknowledged the added packet.

Meanwhile, when the IP address provided for the host B 2 becomes unavailable and is deleted, for example, the controller 2b creates a notification packet where the deleted IP address is not included. The reception/transmission unit 2c or 2d then transmits an notification packet to the host A 1 in order to notify of a group of currently available IP addresses provided for the host B2 where the deleted IP address is not included. One of the reception/transmission units 1c through 1e of the host A1 receive the notification packet and acquires a group of currently available IP addresses provided for the host B2 where the deleted IP address is not included. One of the reception/transmission units 1c through 1e inputs the received notification packet to the controller 1b. The controller 1b may recognize that the IP address is deleted through acquiring a group of IP addresses where the deleted IP address is not included. In this manner, the host B2 may implicitly notify the host A1, of the deletion of available IP address. Note that when an IP address is deleted, as the addition case, the host A1 may transmit a packet, in order to notify the host B2, of recognition the deletion of the IP address, however, it is not always necessary to transmit the packet, since a packet destined for the deleted IP address is not transferred to the host B2, and the unavailable address becomes gradually unused.

(Packet Communication)

With the above-described method, the host A1 and the host B2 notify the target equipment of a plurality of available IP addresses provided for themselves, acquire a plurality of available IP addresses provided for the target equipment from the target equipment, and then start communication. A case where the host A1 transmits data and the host B2 receives data is described as an example. The controller 1b of the host A 1 acquires data from the transmission buffer 1a to create a packet. The controller 1b selects an IP address to be used by the reception/transmission units 1c through 1e from the acquired group of IP addresses of the host B2, and sets the selected IP address as a destination address. The controller 1b also selects one of the reception/transmission units 1c through 1e, which transmits the packet, and sets the IP address provided for the selected one of the reception/transmission units 1c through 1e, as a source address. The controller 1b inputs a created packet to the selected one of the reception/transmission units 1c through 1e. One of the reception/transmission units 1c through 1e then transmits the packet.

The reception/transmission unit 2c or 2d of the host B 2 receives the packet transmitted from the host A1. The reception/transmission unit 2c or 2d inputs the received packet to the controller 2b. The controller 2b checks the source address of the received packet with the acquired group of IP addresses of the host A1. When the source address of the received packet is included in the group of IP addresses of the host A1, the controller 2b recognizes that the packet is a packet transmitted from the host A1. Note that the packet reception/transmission in the case where the host B2 transmits data and the host A1 receives data may be performed in the same manner.

Figure 2:
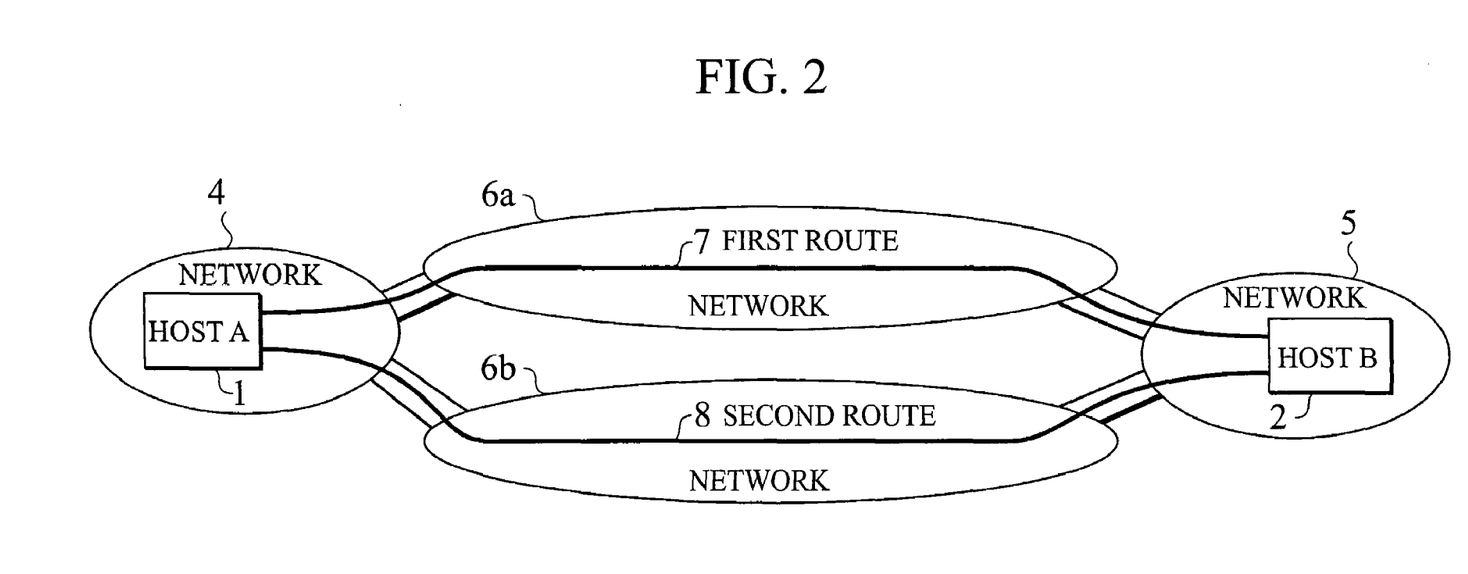
FIG. 2 is a diagram illustrating a state where a plurality of routes exists according to an embodiment of the present invention.

As shown in FIG. 2, a network 4 where the host A1 exists and a network 5 where the host B2 exists are connected via a plurality of networks 6a and 6b. There are a plurality of different routes, such as a first route 7 via the network 6a and a second route 8 via the network 6b, between the host A1 and the host B2. Therefore, the controllers 1b and 2b create and input packets to each of the reception/transmission units 1c through 1e and 2c and 2d, respectively. And, the controllers 1b and 2b control a plurality of reception/transmission units 1c through 1e, 2c, and 2e to perform packet reception/transmission in parallel via a plurality of routes. A plurality of reception/transmission units 1c through 1e, 2c, and 2d then transmit the packet input from the controllers 1b and 2b in parallel via a plurality of routes.

Note that the controllers 1b and 2b preferably encrypt the data included in the packet to be received/transmitted, in preparation for the case where another host begins to use one of the IP addresses which was previously used by the host A1 and the host B2. When another host receives the encrypted packet, the host discards the packet since the host cannot decrypt the data. Therefore, the communication of that host is not be affected. More preferably, the controllers 1b and 2b not only encrypt the data, but also control the reception/transmission units 1c through 1e, 2c, and 2d to reject the reception of unencrypted packets. By this communication affected by another hosts can be prevented.

(Selection of Address Combinations)

The controllers 1b and 2b select the target equipment addresses when performing communication, and the controllers 1b and 2b preferably combine a plurality of addresses provided for themselves with a plurality of target equipment addresses. And, the controllers 1b and 2b select the combination to be used by the reception/transmission units 1c through 1e, 2c, and 2d, from the combinations. Then the controllers 1b and 2b control the reception/transmission units 1c through 1e, 2c, and 2d to perform packet reception/transmission by using the selected combinations. As described above, there are a plurality of routes between the host A1 and the host B2. Therefore, the controllers 1b and 2b select the combination of the plurality of address provided for themselves and the plurality of target equipment addresses, so as to perform communication by selecting the most appropriate route from a plurality of routes between the host A1 and the host B2.

Figure 3:
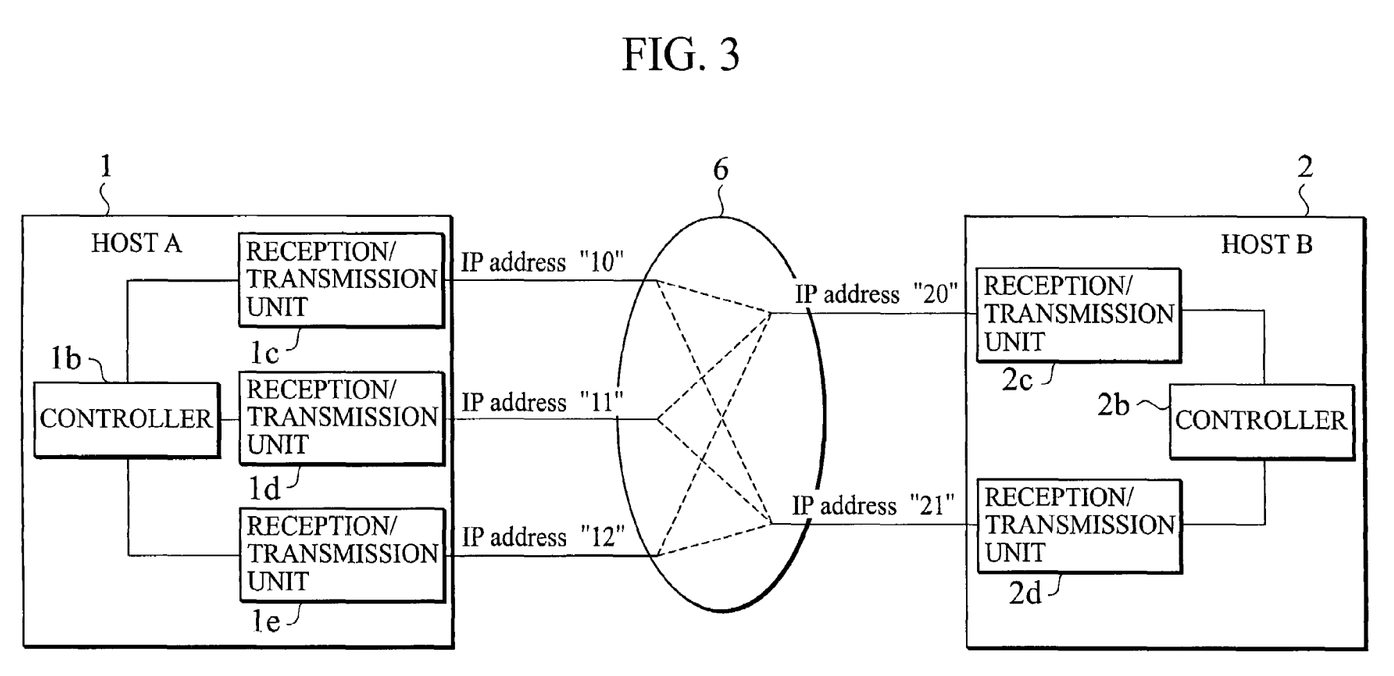
FIG. 3 is a diagram for describing a first selection method for selecting a combination of addresses according to an embodiment of the present invention.

A first selection method for selecting the combination of the addresses is described by using FIG. 3. In FIG. 3, for simplifying the explanation, components not needed for explanation in the first selection method are omitted, and IP addresses are indicated with two-digit numbers. The host A1 and the host B2 are connected via the network 6. There are a plurality of routes via the network 6 between the host A1 and the host B2. IP addresses "10", "11", and "12" are provided for the reception/transmission units 1c through 1d of the host A1, respectively. IP addresses "21" and "22" are provided for the reception/transmission units 2c and 2d of the host B2, respectively. In this case, there are 3×2=6 kinds of combinations of the IP addresses for the host A1 and for the host B2.

The first selection method is described by taking the operation of the host A1 as an example. The controller 1b of the host A1 selects the combinations of the IP addresses of the host A1 and the IP addresses of the host B2 for respective reception/transmission units 1c through 1e from the six kinds of combinations. The controller 1b then instructs the respective reception/transmission units 1c through 1e to connect the TCP connection to the IP address of the host B2 included in the selected combination, and perform packet reception/transmission. The reception/transmission units 1c through 1e connect the TCP connection and perform packet reception/transmission according to the instruction. The controller 1b monitors the state where the reception/transmission units 1c through 1e perform packet reception/transmission from/to the host B2, and measures the packet transmission efficiency. The controller 1b may measure the transmission efficiency through the TCP.

The controller 1b determines disconnection of the TCP connection and abortion of the communication of the combinations for which the packet transmission efficiency is low. The controller 1b then instructs the reception/transmission units 1c through 1e, which connect the determined connection to disconnect the TCP connection and abort the communication. For example, the controller 1b monitors the state of the packet reception/transmission, and determines disconnection of the TCP connection of the combinations where the transmission efficiency is less than the prescribed transmission efficiency threshold. The reception/transmission units 1c through 1e disconnect the TCP connection and abort communication, according to the instruction from the controller 1b. Note that the TCP connection of the combinations where the packet transmission efficiency is high are not disconnected and communication of these combinations continue.

The controller 1b then selects the combination of the IP addresses of the host A1 and the IP addresses of the host B 2 that has not yet been selected for the reception/transmission units 1c through 1e where communication has been aborted. The controller 1b then instructs the respective reception/transmission units 1c through 1e to re-connect the TCP connection to the IP address of the host B2 included in the selected combination, and perform packet reception/transmission. Subsequently, as in the above, the host A1 performs packet reception/transmission, monitors the state, disconnects the TCP connection where the packet transmission efficiency is low, and selects other combinations. The host A may continue packet reception/transmission while giving priority to the combination of the IP addresses of the host A 1 and the IP addresses of the host B2 having high transmission efficiency, through repetition of such sequential operations. Note that the host B2 may perform packet reception/transmission by selecting the most appropriate combination of IP addresses of the host A1 and the IP addresses of the host B2, in the same manner.

Figure 4A:
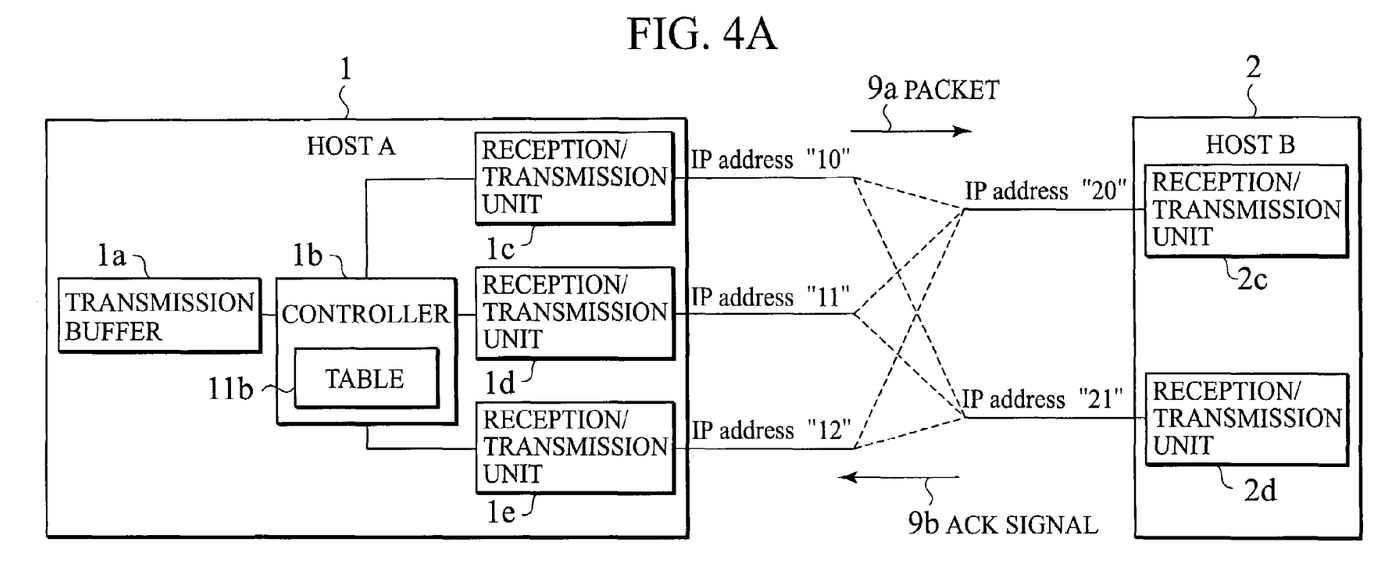
FIG. 4A and FIG. 4B are diagrams for describing a second selection method for selecting a combination of addresses according to an embodiment of the present invention.
Figure 4B:
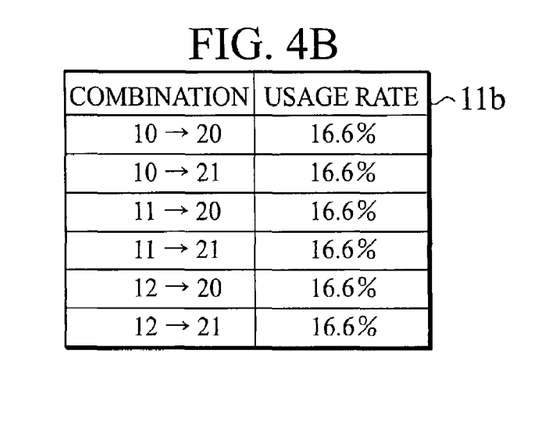

Next, a second selection method for selecting combinations of the IP addresses is described by using FIGS. 4A and 4B. In FIGS. 4A and 4B, for simplifying the explanation, components not needed for explanation of the second selection method are omitted, and IP addresses are indicated with two-digit numbers. The second selection method is described taking the operation of the host A1 as an example. The controller 1b of the host A1 stores rates of all the combinations of the IP addresses of the host A1 and the IP addresses of the host B2 which are used for packet reception/transmission (hereafter, referred to as "usage rate"). More specifically, the controller 1b comprises a table 11b shown in FIG. 4B.

In table 11b, combinations of the IP addresses of the host A1 and the IP addresses of the host B2, and usage rates are stored while relating each other. Note that in the table 11b of the controller 1b of the host A1, combinations of the IP addresses of the host A1 and the IP addresses of the host B 2 are set on the basis of the IP addresses of the host A1, such as "10→20", "10→21", "11→20", "11→21", "12→20", and "12→21". Similarly, in the table of the controller 2b of the host B2, the combinations of the IP addresses of the host A1 and the IP addresses of the host B2 are set on the basis of the IP addresses of the host B2. Table 11b shown in FIG. 4B indicates the initial state. In the initial state, the usage rates of all combinations are set to 16.6% equivalently.

The controller 1b selects a combination of IP addresses of the host A1 and the IP addresses of the host B2 to be used for packet reception/transmission to attain the same usage rates, as stored in the table 11b, when the host A1 performs the packet reception/transmission. The controller 1b may select a combination of IP addresses of the host A1 and the IP addresses of the host B2 by using random numbers, for example. The controller 1b then acquires data from the transmission buffer 1a, and creates a packet to be transmitted by using the selected combination of IP addresses. The controller 1b adds identification data such as a tag which indicates the combination of IP addresses of the host A1 and the IP addresses of the host B2 to be used for transmitting the created packet, to the data used for packet creation and stored in the transmission buffer 1a. In other words, the controller 1b adds the identification data such as a tag, which indicates the combination of IP addresses of the packet transmitted, to the data used for packet creation in the transmission buffer 1a.

The controller 1b inputs the created packet to the reception/transmission units 1c through 1e, which is provided with the IP addresses of the host A1 included in the selected combination. The reception/transmission units 1c through 1e transmit a packet 9a to the host B2. The reception/transmission unit 2c or 2d, which is provided with the IP addresses of the host B2 included in the selected combination receives the packet 9a, and transmits an acknowledgement signal (ACK signal) 9b to the host A1, in response to the packet 9a.

The reception/transmission unit 1c through 1e receives the ACK signal 9b transmitted from the host B2, and then inputs it to the controller 1b. When the ACK signal is input, the controller 1b may confirm that the packet corresponding to the ACK signal has been successfully transmitted and received by the host B2. As a result, the controller 1b detects and deletes the data used for creating the packet corresponding to the ACK signal, from the transmission buffer 1a.

Meanwhile, if the ACK signal is not input from the reception/transmission unit 1c through 1e to the controller 1b after a prescribed period has elapsed, the time for confirming the result of the packet transmission ends. In other words, time-out of transmission confirmation occurs. In this case, the controller 1b retrieves the transmission buffer 1a, and detects the data used for creating the packet, which was transmitted following the packet corresponding to the finally received ACK signal. The controller 1b determines that the packet including detected data did not successfully arrive at the host B2. The controller 1b then acquires the combination of the IP addresses of the host A1 and the IP addresses of the host B2 used for transmitting the packet including the data, based on the identification data such as a tag added to the detected data.

The controller 1b decreases the usage rate of the acquired combination of the IP addresses, and increases the usage rates of other combinations of the IP addresses. For example, the controller 1b divides the decreased usage rate by the number of other combinations, and adds the quotient to all other usage rates of the combinations evenly. The controller 1b updates the usage rate in the table 11b according to the controlled result. Since the controller 1b selects a combination of the IP addresses by using the usage rate stored in the table 11b when transmitting a packet, the usage rate updated in this manner is used for selecting a combination of the IP addresses. In addition, the controller 1b controls the reception/transmission units 1c through 1e to retransmit a packet including the detected data to the host B2. The reception/transmission units 1c through 1e then retransmits the packet to the host B2.

The host A1 may increase the usage rate of the combinations of IP addresses of the host A1 and the IP addresses of the host B2 where the packet may easily arrive at the host B2, and retransmission is not required, through repetition of such sequential operations. As a result, the host A may perform packet reception/transmission by using a combination of IP addresses of the host A1 and the IP addresses of the host B 2 where the packet may easily arrive at the host B2. In other words, the host A1 may perform packet reception/transmission by using a route where the packet may easily arrive at the host B2, and retransmission is not required. Accordingly, the host A1 may improve the packet transmission efficiency. Note that the host B2 may perform packet reception/transmission by selecting the most appropriate combination of the IP addresses of the host A1 and the IP addresses of the host B2, in the same manner. Note that the second selection method may be implemented by extending the TCP, for example.

Note that in FIG. 4B, all usage rates of the combinations are set to the equivalent value in the initial state. However, the usage rate in the initial state may be set to other values. For example, the packet transmission rate may be different for each route determined by a combination of IP addresses of the host A1 and IP addresses of the host B2. In this case, the usage rate in the initial state are preferably set in proportion to the transmission rate of each route determined by a combination of IP addresses of the host A1 and the IP addresses of the host B2.

For example, since IP addresses are provided for the reception/transmission units 1c through 1e, 2c, and 2d, respectively, the controller 1b of the host A1 creates a packet where the transmission rate for respective reception/transmission units 1c through 1e relative to the total transmission rate of all reception/transmission units 1c through 1e corresponds to the IP addresses provided for respective reception/transmission units 1c through 1e. One of the reception/transmission units 1c through 1e then transmit the packet to the host B2. The controller 2b of the host B 2 creates a similar packet, and One of the reception/transmission units 2c and 2d transmit it. The controllers 1b and 2b then calculate a product of their own transmission rate and the transmission rate of the target equipment for every combination of IP addresses of the host A1 and the IP addresses of the host B2, and may use the result as the initial values of the usage rates.

More specifically, the controller 1b calculates a product of the transmission rates of respective reception/transmission units 1c through 1e relative to the total transmission rate of all reception/transmission units 1c through 1e of the host A 1, and the transmission rate of respective reception/transmission units 2c and 2d relative to the total transmission rate of all reception/transmission units 2c and 2d of the host B2 transmitted from the host B2, as an initial value of the usage rate for every combination of the IP addresses of the host A1 and the IP addresses for the host B2. Similarly, the controller 2b calculates products of the transmission rates of respective reception/transmission units 2c and 2d relative to the total transmission rate of all reception/transmission units 2c and 2d of the host B2 and the transmission rates of respective reception/transmission units 1c through 1e relative to the total transmission rate of all reception/transmission units 1c through 1e of the host A1 transmitted from the host A1, as an initial value of the usage for every combination of the IP addresses of the host A1 and the IP addresses of the host B2.

Note that initial values of the usage rates may be set by using the transmission rate of the network where each route determined by a combination of the addresses of the host A1 and the addresses of the host B2 exists, other than the transmission rate of the reception/transmission units 1c through 1e, 2c, and 2d. In this case, even if the maximum transmission rate of a wireless LAN is 11 Mbps, the effective transmission rate may be lower, for example, 2 Mbps. Therefore, the initial value of the usage rate is preferably set, by using the effective transmission rate of every network.

In this manner, when the usage rate in the initial state is set in proportion to the transmission rate of each route determined by a combination of the IP addresses of the host A 1 and the IP addresses of the host B2, the usage rate of the combination of the IP addresses of the host A1 and the IP addresses of the host B2 with higher transmission rate and suitability for usage may increase. Accordingly, the hosts A 1 and B2 may perform packet reception/transmission using a combination of the addresses with higher transmission rates and higher transmission efficiency. More specifically, when the initial value is set by using the transmission rate of each reception/transmission unit relative to the total transmission rate of all reception/transmission units, the host A1 and the host B2 may use the reception/transmission unit with the higher transmission rate.

(Mobile Communication)

Figure 5:
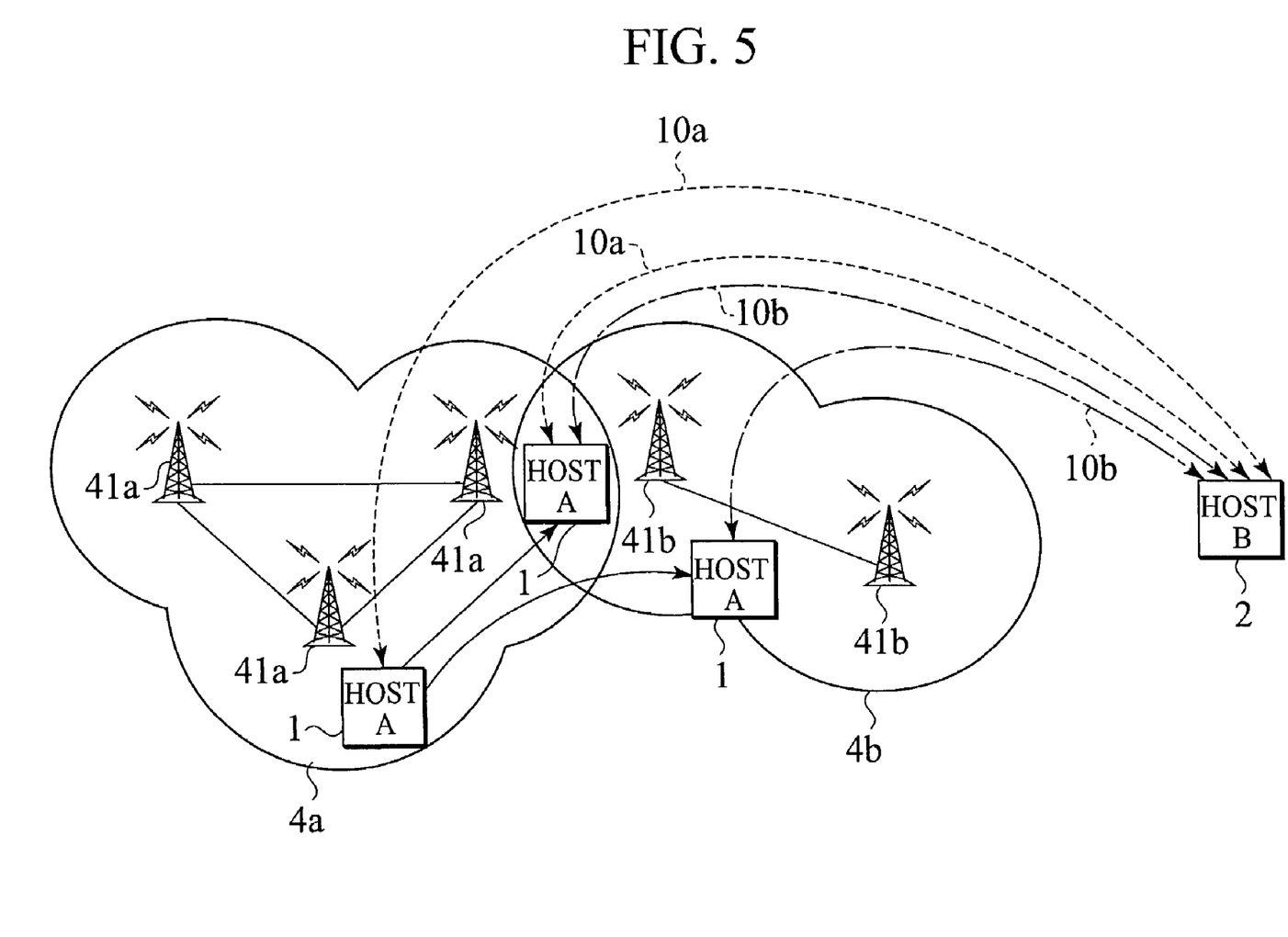
FIG. 5 is a diagram illustrating mobile communication according to an embodiment of the present invention.

A case where the host A1 is mobile is described using FIG. 5. In FIG. 5, a plurality of base stations 41a constitutes a network 4a; and a plurality of base stations 41b configures a network 4b. Initially, the host A1 exists in the network 4a. The host A1 connects to the base station 41a to connect to the network 4a, and performs packet reception/transmission from/to the host B2. In this case, the controller 1b of the host A1 creates a notification packet including the IP addresses available in the network 4a, from a plurality of IP addresses provided for the host A1. And the controller 1b instructs one of the reception/transmission units 1c through 1e to notify the host B2. In addition, the controller 1b instructs the reception/transmission units 1c though 1e to which the IP addresses available in the network 4a are provided to perform packet reception/transmission.

The reception/transmission unit 2c or 2d of the host B 2 receives the notification packet, and the controller 2b acquires the IP address available for packet reception/transmission from/to the host A1 existing in the network 4a. The controller 2b creates a response packet including a group of available IP addresses provided for the host B2, and inputs the created response packet to either reception/transmission unit 2c or 2d. The reception/transmission unit 2c or 2d transmits the response packet to the host A1. Subsequently, the controller 2b selects the IP address available for communication with the host A1, and available for the host A 1 in the network 4a, as the IP address to be used for packet reception/transmission. The controller 2b instructs the reception/transmission units 2c and 2d to perform packet reception/transmission by transmitting a packet to the selected IP address. As a result, the reception/transmission units 1c through 1e provided with the IP addresses available in the network 4a and reception/transmission units 2c and 2d connect the connection 10a, and perform packet reception/transmission.

When the host A1 moves and arrives in the vicinity of the boundary between the network 4a and the network 4b, the host A1 becomes able to receive both radio waves from the base stations 41a and the base station 41b, and to use both radio waves. In this case, the host A1 connects to the base station 41b to connect to the network 4b while maintaining connection with the base stations 41a. Therefore, the host A1 may use the IP addresses available in the network 4b in addition to the IP addresses available in the network 4a.

The controller 1b for the host A1 creates a notification packet including the IP address available in the network 4a and the IP address available in the network 4b, which are added to the available IP addresses. The controller 1b instructs one of the reception/transmission units 1c through 1e to transmit the notification packet to the host B2. In addition, the controller 1b instructs the reception/transmission units 1c through 1e provided with the IP addresses available in the network 4a and the reception/transmission units 1c through 1e provided with the IP addresses available in the network 4b, to perform packet reception/transmission. In this manner, the controller 1b controls them so that a plurality of reception/transmission units 1c through 1e performs packet reception/transmission in parallel.

The controller 2b may learn that the IP addresses available in the network 4b become available, in addition to the IP addresses available in the network 4a, when the reception/transmission units 2c and 2d of the host B2 receive the notification packet. The controller 2b selects a plurality of IP addresses, which are available for the host A1 both in the network 4a and the network 4b, as the target equipment address available for communication with the host A1. The controller 2b instructs the reception/transmission units 2c and 2d to perform packet reception/transmission by transmitting a packet to the plurality of selected IP addresses. The reception/transmission units 1c through 1e and reception/transmission units 2c and 2d provided with the IP addresses available in the network 4b then connect a new connection 10b, in addition to the connection 10a, and perform packet reception/transmission. As a result, the host A1 and the host B2 may perform packet reception/transmission using two routes at the same time. Accordingly, the host A1 may perform high-speed data transfer, that is, may perform more effective data transfer by using a plurality of routes.

Meanwhile, when the host A1 moves, and arrives at a position where only radio waves of base stations 41b in the network 4b may be received, from the network 4a, the addresses available in the network 4a become unavailable in the network 4b. The controller 1b of the host A1 creates an notification packet, which the IP addresses available in the network 4a, which become unavailable are not included, but the IP addresses available in the network 4b only, are included. The controller 1b instructs the reception/transmission units 1c through 1e to transmit the notification packet to the host B2. In addition, the controller 1b instructs the reception/transmission units 1c through 1e provided with the IP addresses available in the network 4a, to abort packet reception/transmission, and the reception/transmission units 1c through 1e provided with the IP addresses available in the network 4b, to perform packet reception/transmission. In this manner, the controller 1b switches the reception/transmission unit to perform packet reception/transmission.

When the reception/transmission units 2c and 2d of the host B2 receive the notification packet, the controller 2b may learn that the IP addresses available in the network 4a have become unavailable, and that the IP addresses available in the network 4b have become available. The controller 2b then selects the IP address available for communication with the host A1, and available for the host A1 in the network 4b as the IP address to be used for reception/transmission from/to the host A1. The controller 2b instructs the reception/transmission units 2c and 2d to perform packet reception/transmission by transmitting a packet to the selected IP address. The reception/transmission units 1c through 1e and the reception/transmission units 2c and 2d provided with the IP addresses available in the network 4a then disconnect the connection 10a. In addition, the reception/transmission units 1c through 1e and reception/transmission units 2c and 2d provided with the IP addresses available in the network 4b connect the new connection 10b with the host B2, and perform packet reception/transmission. In other words, the host A1 and the host B2 may easily continue the communication between the host A1 and the host B2 that has been performed up until now, by switching the connection 10a to the connection 10b. Note that the host A1 and the host B2 may similarly perform the packet reception/transmission, even in the case where the host B2 moves or in the case where both host A1 and the host B2 move.

[Communication Method]

Figure 6:
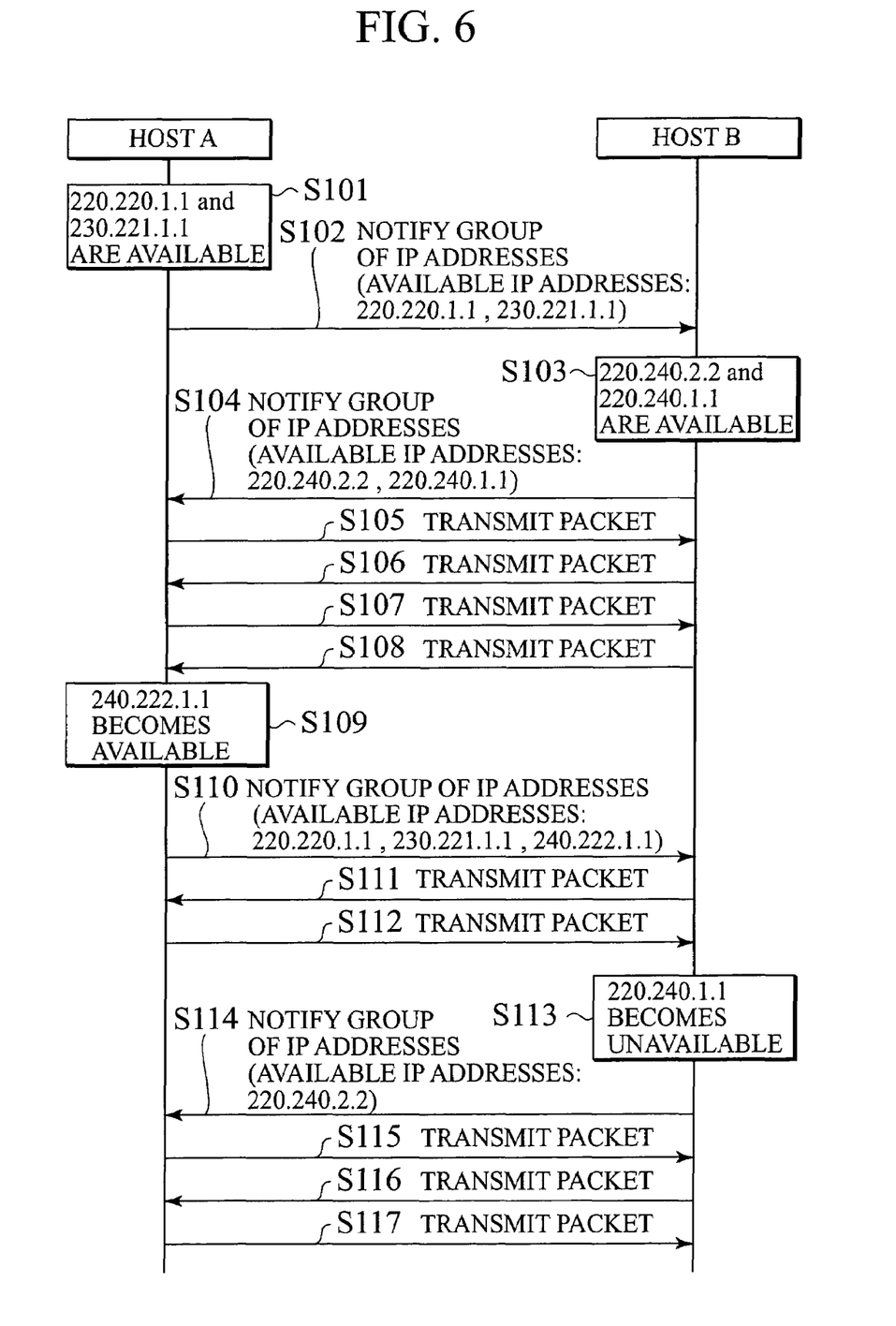
FIG. 6 is a flowchart illustrating a procedure of a communication method according to an embodiment of the present invention.

Next, a communication method using such a communication system is described. As shown in FIG. 6, to begin with, the host A1 inquires after a group of IP addresses of the host B 2 from the DNS server 3, using the domain name of the host B 2 as a key, and acquires a group of IP addresses of the host B2, before starting communication. Initially, two IP addresses, 220.220.1.1 and 230.221.1.1 are provided for the host A1, and those are available (S101). The host A1 creates an notification packet including a group of available IP addresses provided for the host A1, "220.220.1.1, and 230.221.1.1", and sets one IP address included in the acquired group of IP addresses of the host B2 as a destination address of the notification packet. The host A1 then transmits the notification packet to the host B2 to notify the host B2 of the group of IP addresses available for the host A1 (S102). The host B2 that has received the notification packet acquires a group of available IP addresses provided for the host A1 from the notification packet. Subsequently, the host B2 recognizes that all the packets where addresses of acquired group of IP addresses, provided for the host A1 are set as the destination address are the ones transmitted from the host A1.

Meanwhile, two IP addresses, 220.240.2.2 and 220.240.1.1 are provided for the host B2, and those are available (S103). The host B2 creates a response packet including a group of available IP addresses provided for the host B2, "220.240.2.2, and 220.240.1.1" in response to the notification packet from the host A1, and sets the source address of the notification packet as a destination address of the response packet. The host B2 then transmits the response packet to the host A1 to notify the host A1 of the group of IP addresses available for the host B2 (S104). The host A1 that has received the response packet acquires a group of available IP addresses provided for the host B2 from the response packet. Subsequently, the host A1 recognizes that all packets where addresses of the acquired group of IP addresses, provided for the host B2 are set as the source address are the ones transmitted from the host B2.

In this manner, the host A1 and the host B2 notify the target equipment of a plurality of IP addresses provided for themselves, and acquire a plurality of IP addresses provided for the target equipment from the target equipment. Then the host A1 transmits a packet to the host B2 using the IP address of the host A1 and the IP address of the host B2 (S105). The host B2 transmits a packet to the host A1 using the IP address of the host B2 and the IP address of the host A1 (S106). Such packet reception/transmission is repeated (S107, S108).

When a new IP address 240.222.1.1 becomes available for the host A1 during the packet reception/transmission (S109), the host A1 transmits to the host B2 a notification packet including the IP address 240.222.1.1 which newly becomes available, and the IP addresses 220.220.1.1 and 230.221.1.1 which have been available, in order to notify of a group of available IP addresses (S110). The host B2 that has received the notification packet acquires the IP address of the host A1 newly added.

Subsequently, the host B2 transmits a packet to the host A1 also using the IP address of the host A1 newly added (S111). In addition, the host A1 transmits a packet to the host B2 also using the IP address for the host A1 newly added (S112). When the IP address 220.240.1.1 used by the host B2 becomes unavailable during the packet reception/transmission (S113), the host B2 transmits to the host A1 a notification packet in which the unavailable IP address, 220.240: 1.1 is not included, and only the currently available IP address 220.240.2.2, is included, in order to notify the host A1 of the available IP address (S114). The host A1 that has received the notification packet recognizes that the IP address 220.240.1.1 has become unavailable.

Subsequently, the host A1 transmits a packet to the host B2 using the only IP address of the host B2 which is currently available (S115). In addition, the host B2 transmits a packet to the host A1 using the only IP address of the host B2 which is currently available (S116). Such packet reception/transmission is repeated (S117).

According to the communication system, host A1, host B 2, and the communication method, a plurality of IP addresses are provided for the host A1 and the host B2. And, the reception/transmission units 1c through 1e and 2c and 2d notify the host B2 or the host A1, which is target equipment to perform communication with each other, of a plurality of IP addresses, respectively. In addition, the reception/transmission units 1c through 1e, 2c, and 2d receive and acquire a plurality of addresses of the target equipment. The reception/transmission units 1c through 1e, 2c, and 2d then perform packet reception/transmission using a plurality of addresses provided for the host A1 and host B2 themselves and the plurality of acquired target equipment addresses of the host B2 and the host A1, which are target equipment for each other. In this case, the controllers 1b and 2b select the target equipment addresses to be used by the reception/transmission units 1c through 1e, 2c, and 2d, and control the reception/transmission units 1c through 1e, 2c, and 2d to perform packet reception/transmission using the selected target equipment addresses.

Accordingly, the host A1 and the host B2 may perform packet reception/transmission via a plurality of routes by using a plurality of IP addresses provided for themselves and a plurality of target equipment addresses. As a result, the host A1 and the host B2 may perform high-speed data transfer, that is, may perform more effective data transfer. In addition, when the host A1 and the host B2 move, the host A1 and the host B2 may use a plurality of IP addresses provided for themselves, even if they move between different networks 4a and 4b. Accordingly, the host A1 and the host B2 do not require to acquire a new address, and may continue communication. In addition, when the host B2 and the host A1, which are target equipment for each other, each move, the host A1 and the host B2 may use a plurality of target equipment addresses, even if they move between different networks 4a and 4b. As a result, the host A1 and the host B2 may continue to maintain prior communication. Accordingly, the host A1 and the host B2 may guarantee continuous mobile communication.

In addition, the controllers 1b and 2b may combine a plurality of IP addresses of the host A1 and a plurality of IP addresses of the host B2, and select a combination to be used by the reception/transmission units 1c through 1e, 2c, and 2d from the combinations. The controllers 1b and 2b control the reception/transmission units 1c through 1e, 2c, and 2d to perform packet reception/transmission by using the IP address of the host A1 and the IP address of the host B2 included in the selected combination. As a result, the host A1 and the host B2 may select a combination of their own addresses and the target equipment addresses, and communicate using them to perform packet reception/transmission using an appropriate route. Accordingly, the host A1 and the host B2 may perform packet reception/transmission via a more preferable route, and perform more effective data transfer.

In addition, the controller 1b selects the available target equipment address, that is, the available IP address of the host B2, as the target equipment address, that is, the IP address of the host B2 to be used by the reception/transmission units 1c through 1e. Similarly, the controller 2b selects the available target equipment address, that is, the available IP address of the host A1 as the target equipment address, that is, the IP address of the host A1 to be used by the reception/transmission units 2c and 2d. Accordingly, the host A1 and the host B2 may select the available IP address from a plurality of target equipment addresses, and continue to maintain prior communication, even if any address of a plurality of IP addresses of the host B2 or the host A1 acquired target equipment addresses has become unavailable for any reason. For example, when the host B2 or host A1, which is a target equipment, moves to another network, the host A1 and the host B2 may select the target equipment address available in the network at the destination and continue communication.

In addition, the host A1 and the host B2 comprise a plurality of reception/transmission units 1c through 1e, 2c, and 2d, and the IP address to be used is provided for each of the plurality of reception/transmission units 1c through 1e, 2c, and 2d. The controllers 1b and 2b then control the plurality of reception/transmission units 1c through 1e, 2c, and 2d to perform packet reception/transmission in parallel. Accordingly, the host A1 and the host B2 may perform packet reception/transmission via a plurality of routes by using a plurality of IP addresses provided for themselves and a plurality of target equipment addresses. As a result, the host A1 and the host B2 may perform high-speed data transfer, that is, may perform more effective data transfer.

Furthermore, when the host A1 and the host B2 comprise a plurality of reception/transmission units 1c through 1e, 2c, and 2d, and the IP address to be used is provided for each plurality of reception/transmission units 1c through 1e, 2c, and 2d, the controllers 1b and 2b may switch the reception/transmission unit to perform packet reception/transmission, among the reception/transmission units 1c through 1e, 2c, and 2d. Accordingly, the host A1 and the host B2 may switch among reception/transmission units 1c through 1e, 2c, and 2d, based on the communication state. For example, when the host A1 and the host B2 move to different networks 4a and 4b, it is possible to continue communication easily by switching the reception/transmission unit provided with an address available in the network of the destination, among the reception/transmission units 1c through 1e, 2c, and 2d.

[Modified Example]

The present invention is not limited to the described above embodiment, and various modifications are possible. In the second selection method for selecting a combination of the IP addresses, the host A1 and the host B2 preferably receive/transmit packet added identification data such as a tag to distinguish each packet, and confirm which packets successfully arrive at the target equipment and which packets do not successfully arrive at the target equipment by using the identification data such as a tag.

Figure 7:
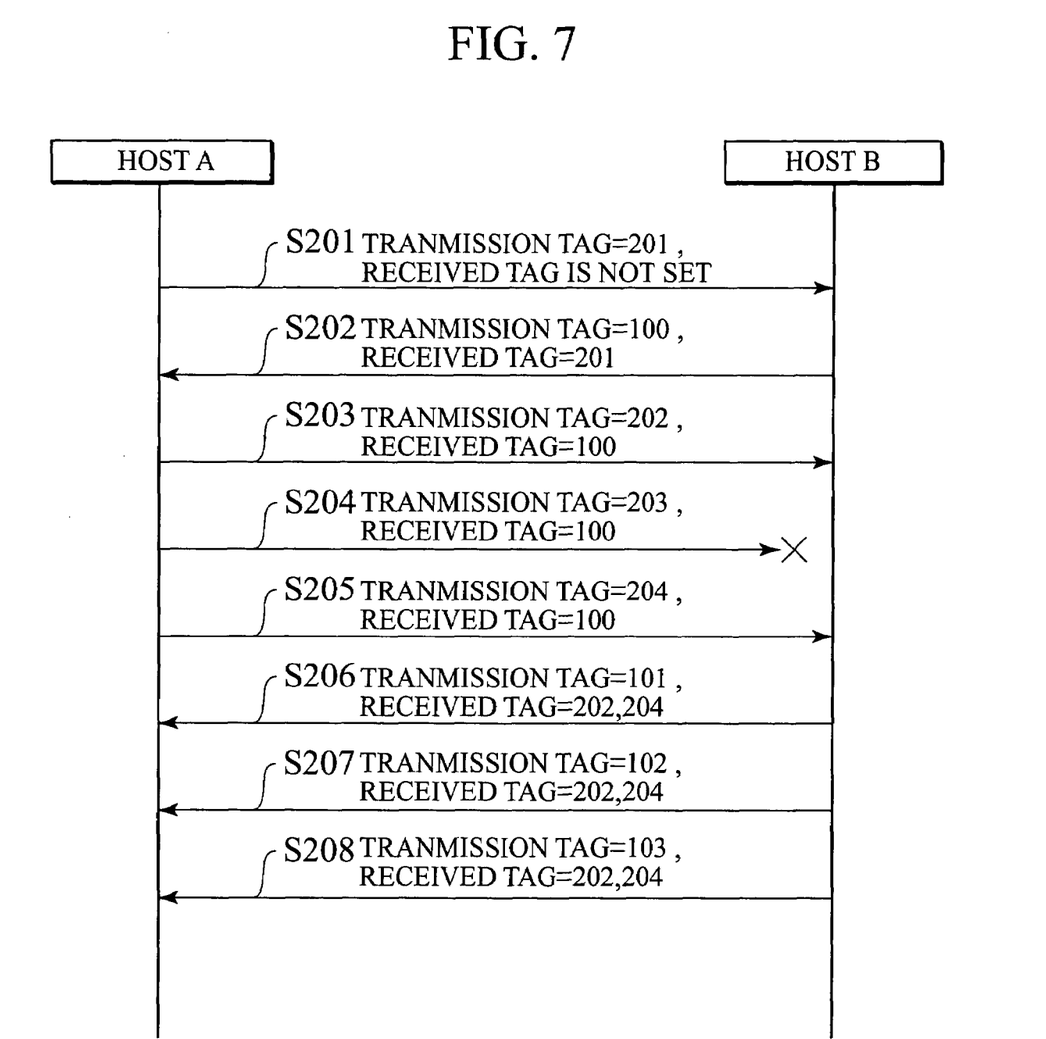
FIG. 7 is a sequence diagram illustrating a procedure of a second selection method for selecting a combination of addresses according to a modified example of the present invention.

For example, as shown in FIG. 7, when the controller 1b of the host A1 which transmits a packet, at first acquires data from the transmission buffer 1a and creates a packet to be transmitted by using the combination of the selected IP addresses, the controller 1b adds the identification data such as a transmission tag to distinguish each packet to be transmitted, to the packet. More specifically, the controller 1b sets an identification number 201 as a transmission tag to distinguish a packet. In this case, since there are no packets transmitted from the host B2, identification data such as a received tag to distinguish the received packet is not set. One of the reception/transmission units 1c through 1e then transmit the packet to which a transmission tag is added and a received tag is not set, to the host B2 (S201). In this case, the controller 1b also adds a transmission tag with identification number 201 to data used for packet creation stored in the transmission buffer 1a.

After receiving a packet, the host B2 transmits a packet to the host A1 with the transmission tag transmitted from the host A1 instead of transmitting an ACK signal to the host A 1. More specifically, when the controller 2b of the host B2 acquires data from the transmission buffer 2a and creates a packet to be transmitted using the combination of the selected IP addresses, the controller 2b adds the identification data such as a transmission tag to distinguish each packet to be transmitted and the identification data such as a received tag to distinguish the packet received from the host A1, to the packet. More specifically, the controller 2b sets an identification number 100 as the transmission tag to distinguish the packet, and the identification number 201 in the received transmission tag as the received tag. The reception/transmission units 2c and 2d then transmit the packets to which a transmission tag and received tag are added, to the host A1 (S202). In this case, the controller 2b also adds a transmission tag with the identification number 100 to data used for packet creation stored in the transmission buffer 2a.

The host A1 receives the packet, and the controller 1b confirms that the packet with the identification number 201 has been successfully transmitted and has received by the host B 2 from the added received tag. Therefore, the controller 1b searches the transmission buffer 1a based on the identification number 201, detects data used for creating the packet with the identification number 201, and deletes it from the transmission buffer 1a.

Next, when the controller 1b acquires data from the transmission buffer 1a and creates a packet to be transmitted using the combination of the selected IP addresses, the controller 1b adds the identification data, such as a transmission tag to distinguish each packet and the identification data such as a received tag to distinguish the packet received from the host B2, to the packet. More specifically, the controller 2b sets identification numbers 202, 203, and 204 as the transmission tags, and the identification number 100 in the received transmission tag as the received tag. The reception/transmission units 1c through 1e then transmit the packets to which transmission tags and received tag are added, to the host B2 (S203 through S205). In this case, the controller 1b also adds the transmission tags with identification numbers 202, 203, and 204 to each piece of data used for packet creation stored in the transmission buffer 1a. The packets transmitted in steps (S203) and (S205) have successfully received by the host B2; the packet transmitted in step (S204) has not successfully received by the host B2.

In this case, when creating a packet to be transmitted by the controller 2b of the host B2, the controller 2b sets the identification numbers 101, 102, and 103 to distinguish the packet as the transmission tags, and the identification numbers 202 and 204 in the received transmission tag as the received tag, respectively. The controller 2b does not set the identification number 203 in the transmission tag of the packet, which was not received, as the received tag. The reception/transmission units 2c and 2d then transmit the packets to which a transmission tag and received tag of the packet successfully received by the host B2 are added, to the host A1 (S206) through (S208). In this case, the controller 2b adds the transmission tags with identification numbers 101, 102, and 103 to data used for packet creation stored in the transmission buffer 2a. The controller 1b of the host A1 confirms that the packets with the identification numbers 202 and 204 have been successfully transmitted and have received by the host B2 from the added received tag. Therefore, the controller 1b searches the transmission buffer 1a based on the identification numbers 202 and 204, detects data used for creating the packets with the identification numbers 202 and 204, and deletes them from the transmission buffer 1a.

Meanwhile, the controller 1b of the host A1 determines that the packet with the identification number 203 has not been successfully transmitted and has not received by the host B2, based on the fact that the identification number 203 is not included in the added received tags. The controller 1b then searches the transmission buffer 1a based on the identification number 203, and detects data used for creating the packet with the identification number 203. The controller 1b then acquires the combination of the IP addresses of the host A1 and the host B2 used for transmitting the packet including the data, based on the identification data such as a tag added to the detected data. The controller 1b decreases the usage rate of the acquired combination of IP addresses, and increases the usage rates of other combinations of IP addresses. The controller 1b updates the usage rates in the table 11b according to the controlled result. In addition, the controller 1b controls the reception/transmission units 1c through 1e to retransmit a packet with the identification number 203 to the host B2. The reception/transmission units 1c through 1e then retransmit the packet to the host B2.

Accordingly, the controllers 1b and 2b may explicitly recognize which packets have been successfully transmitted and received by the target equipment, and which packets have not been successfully transmitted and have not been received by the target equipment. Therefore, the usage rate of the combinations of the IP addresses for which the packets easily arrive at the target equipment and it is not necessary to retransmit packets increase, and it is possible to hasten the convergence of the usage rate to those combinations. Accordingly, the controllers 1b and 2b may control the combination of the IP addresses effectively and appropriately. In addition, the controllers 1b and 2b may confirm whether the transmission tag is successfully transmitted and the received tag corresponding to the transmission tag is transmitted or not, by receiving the received tag corresponding to the transmission tag of the transmitted packet from the target equipment. Note that the second selection method may be implemented by extending the TCP, for example.

The present invention is also available for Ipv4 addresses and Ipv6 addresses. In addition, in the above-described embodiment, when a group of available IP addresses is changed, the host A1 and the host B2 notify all available IP addresses, however, the host A1 and the host B2 may notify of all groups of IP addresses provided for each communication equipment initially, and subsequently, if there is a change in a group of available IP addresses, the host A 1 and the host B2 may notify only the added or deleted IP address.

What is claimed:

1. A communication equipment comprising:
   a reception/transmission unit configured to notify a target equipment of a plurality of addresses provided for the communication equipment, acquire a plurality of target equipment addresses provided for the target equipment, from the target equipment, and perform packet reception/transmission using a plurality of provided addresses and a plurality of acquired target equipment addresses; and
   a controller configured to select the target equipment address to be used by the reception/transmission unit, and control the reception/transmission unit to perform the packet reception/transmission using a selected target equipment address;
   wherein the controller combines the plurality of addresses provided for the communication equipment with the plurality of target equipment addresses, selects a combination of one communication equipment address and one target equipment address to be used by the reception/transmission unit from the combinations by selecting a preferred route of communication, and controls the reception/transmission unit to perform the packet reception/transmission by using the selected combination.

2. The communication equipment of claim 1, wherein the controller selects an available target equipment address as the target equipment address to be used by the reception/transmission unit.

3. The communication equipment of claim 1, further comprising: a plurality of reception/transmission units provided with the plurality of addresses for each of the reception/transmission units, wherein the controller controls the plurality of reception/transmission units to perform the packet reception/transmission in parallel.

4. The communication equipment of claim 1, further comprising: a plurality of reception/transmission units provided with the plurality of addresses for each of the reception/transmission units, wherein the controller switches the reception/transmission unit to perform the packet reception/transmission.

5. A communication system comprising:
   a communication equipment provided with a plurality of addresses; and
   a target equipment provided with a plurality of target equipment addresses, and configured to perform packet reception/transmission from/to the communication equipment, wherein the communication equipment comprises:
      a reception/transmission unit configured to notify the target equipment of a plurality of provided addresses, acquire the plurality of target equipment addresses from the target equipment, and perform the packet reception/transmission using the plurality of provided addresses and a plurality of acquired target equipment addresses; and
      a controller configured to select the target equipment address to be used by the reception/transmission unit, and control the reception/transmission unit to perform the packet reception/transmission using a selected target equipment address;
   wherein the controller combines the plurality of addresses provided for the communication equipment with the plurality of target equipment addresses, selects a combination of one communication equipment address and one target equipment address to be used by the reception/transmission unit from the combinations by selecting a preferred route of communication, and controls the reception/transmission unit to perform the packet reception/transmission by using the selected combination.

6. A communication method comprising:
   notifying a target equipment of a plurality of addresses provided for a communication equipment; acquiring a plurality of target equipment addresses provided for the target equipment, from the target equipment;
   combining the plurality of addresses with the plurality of target equipment addresses;
   selecting the target equipment address to be used for packet reception/transmission from the combinations by selecting a preferred route of communication; and
   performing the packet reception/transmission using the the selected combination of addresses.

7. The communication equipment of claim 1, wherein the controller is configured to change the selected combination of addresses to a new combination when the efficiency of packet reception/transmission for the currently used combination is less than a prescribed efficiency threshold.

8. The communication equipment of claim 1, wherein each combination of addresses is assigned a usage rate, and the usage rate for each respective combination used by the reception/transmission unit is decreased when packet transmission is unsuccessful using the corresponding combination and increased when packet transmission is successful using the corresponding combination.

9. The communication equipment of claim 8, wherein usage rates initially assigned to the combination of addresses are based on transmission rates predicted by the controller for the combination of addresses.

* * * * *